Nov. 6, 1928.

J. C. KANE 1,690,413

OSCILLATOR

Filed April 5, 1923

Inventor
John C. Kane

By
Attorney.

Patented Nov. 6, 1928.

1,690,413

UNITED STATES PATENT OFFICE.

JOHN C. KANE, OF DETROIT, MICHIGAN.

OSCILLATOR.

Application filed April 5, 1923. Serial No. 630,092.

My invention relates to a new and useful improvement in an oscillator and has for its object the provision of means for utilizing the oscillations set up in oscillatory members positioned on either side of a moving stream of energy, such as current of electricity or a flow of water.

Another object of the invention is the provision of oscillatory members positioned at the side of a flowing body of matter and so adjusted as to vibrate in response to the vibrations of the flowing matter.

Another object of the invention is the provision of means for conducting a flow of matter between a pair of oscillatory members, and of means for maintaining said members in vibratory unison, during the flow of matter through said conductor.

Other objects will appear hereinafter.

The invention consists in the combinations and arrangements of parts hereinafter described and claimed.

Figure 1:
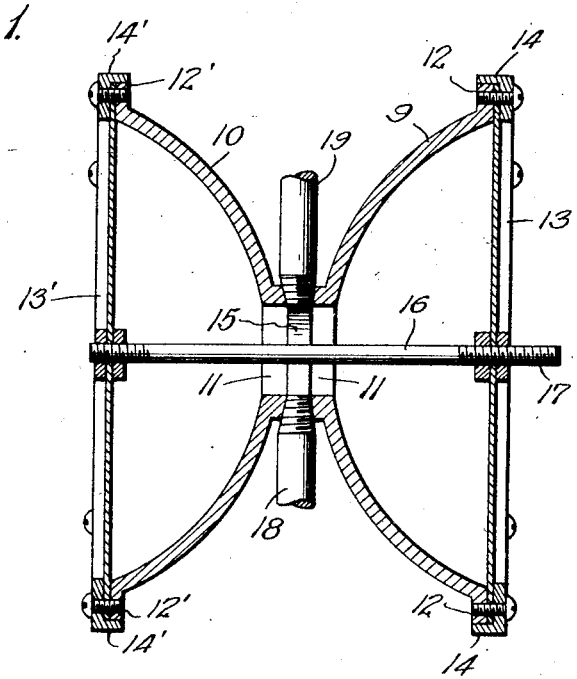
Figure 2:
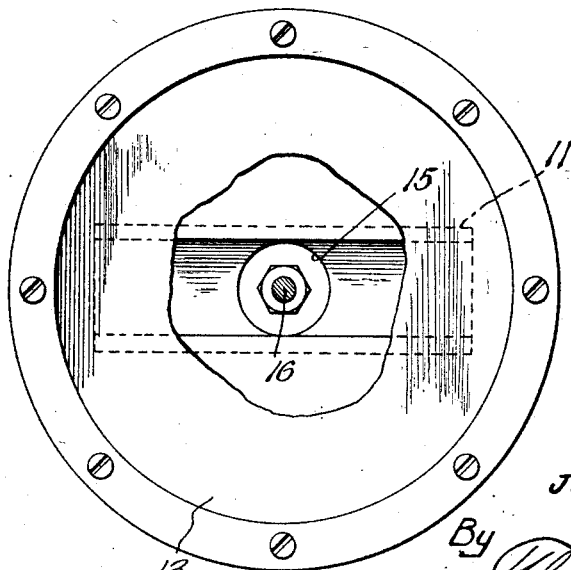

The invention will be best understood from a reference to the accompanying drawings which form a part of this specification and in which, Fig. 1 is a central, longitudinal vertical sectional view of the invention, Fig. 2 is a side elevational view of one of the capacities used in the invention.

The invention seeks to utilize the vibrations which are set up in a body positioned adjacent the path of travel of matter in motion. In Figs. 1 and 2 I have shown an application of the invention with flowing water and the principle of the invention will readily appear from a description of this form of device. I have provided two members, 9 and 10, which are formed semi-spherical, and which for the purposes of this description are termed "capacities," as that term may be used generally for containers of matter adapted to receive vibrations from a flow of matter traveling adjacent thereto. These members have positioned between them an elongated container 11 communicating with each capacity by means of an opening formed in the member 11 at each side thereof. It is apparent that the members 9 and 10 and the member 11 together form a single container as all of these parts are in communication with each other. The capacities 9 and 10 are each provided with a circumferential flange 12 and 12' respectively which engage respective diaphragms 13 and 13' each of which is provided with a peripheral flange 14 and 14' respectively, bolts being projected through the diaphragms and the flanges 12 and 12' to bind these parts tightly together, a gasket being interposed between these parts if desired or necessary. A rod 16 is projected through the openings 15 and serves to connect the oppositely disposed diaphragms together. One end of this rod is projected exteriorly of the diaphragms and provided with an extension 17 to which any desired connection may be made to utilize the oscillations imparted to the portion 17 by the diaphragms. An inlet pipe 18 and an outlet pipe 19 communicate with the interior of the member 11.

In operation the pipes 18 and 19 may be used to conduct water, air or any other fluid into the capacities, one of these pipes conducting the fluid into the member 11 and the other conducting it away from the member, so that there will be a continuous flow of matter through the pipes. As the fluid is delivered to the pipes the capacities will of course become filled with it and the outlet pipe will serve to conduct it away, the pressure in all of these parts being substantially equal. As the current of matter flowing through the capacities is brought to a certain velocity and attains a certain pressure the diaphragms are set into vibration so as to oscillate the member 17. In order to cause a vibration of the diaphragms it is necessary that the flow of matter have certain vibrations with which the diaphragms may vibrate in sympathy. The size and style of the vibrations may, therefore, be varied according as the intensity and the nature of the current of matter varies.

Having thus described my invention what I claim as new and desire to secure by Letters Patent is:

1. A device of the class described, comprising a tubular liquid container; a delivery pipe communicating with said container for delivering liquid thereinto; an outer pipe for conducting liquid from said container; a liquid container at opposite sides of said first-mentioned liquid container and communicating therewith; a vibratory closure for each of said oppositely disposed liquid containers; and means for connecting each of said vibratory closures.

2. A device of the class described, comprising a centrally disposed liquid container; a delivery pipe communicating with said container for delivering liquid thereinto;

an outer pipe communicating with said container for delivering liquid therefrom; a pair of liquid containers mounted on opposite sides of said centrally disposed liquid container and communicating therewith; a vibratory closure for each of said oppositely disposed liquid containers; and means for connecting said closures with each other.

3. A device of the class described, comprising a pair of reversely positioned semi-spherical liquid containers; a tubular neck for connecting said containers in communication with each other; a delivery pipe communicating with said neck for delivering liquid thereinto; an outer pipe communicating with said neck for delivering liquid therefrom; a vibratory closure for the open end of each of said semi-spherical containers; and means for connecting said closures for effecting movement of the same in unison with each other upon vibration.

4. A device of the class described, comprising: a liquid container; a pair of vibratory side walls on said container and adapted for contact with the contents thereof; a conduit for conducting fluid into said container; and a conduit for conducting fluid from said container, said conduits communicating with said container between said side walls.

5. A device of the class described, comprising: a liquid container; a pair of vibratory side walls on said container and adapted for contact with the contents thereof; a conduit for conducting fluid into said container; a conduit for conducting fluid from said container, said conduits communicating with said container between said side walls; and means connecting said side walls and movable therewith upon vibration of said side walls.

In testimony whereof I have signed the foregoing specification.

JOHN C. KANE.